United States Patent
Hakewill et al.

(10) Patent No.: US 8,719,837 B2
(45) Date of Patent: May 6, 2014

(54) MICROPROCESSOR ARCHITECTURE HAVING EXTENDIBLE LOGIC

(75) Inventors: James Hakewill, San Jose, CA (US); Rich Fuhler, Santa Cruz, CA (US)

(73) Assignee: Synopsys, Inc., Mountain View, CA (US)

( * ) Notice: Subject to any disclaimer, the term of this patent is extended or adjusted under 35 U.S.C. 154(b) by 2095 days.

(21) Appl. No.: 11/132,424

(22) Filed: May 19, 2005

(65) Prior Publication Data

US 2005/0289321 A1    Dec. 29, 2005

(51) Int. Cl.
 *G06F 9/46* (2006.01)
(52) U.S. Cl.
 USPC .......................................................... 718/108
(58) Field of Classification Search
 USPC .......................................................... 718/108
 See application file for complete search history.

(56) References Cited

U.S. PATENT DOCUMENTS

| | | |
|---|---|---|
| 4,216,539 A | 8/1980 | Raymond et al. |
| 4,342,082 A | 7/1982 | Brown et al. |
| 4,594,659 A | 6/1986 | Guenthner et al. |
| 4,829,460 A | 5/1989 | Ito et al. |
| 4,831,571 A | 5/1989 | Tokumaru et al. |
| 4,905,178 A | 2/1990 | Mor et al. |
| 4,914,622 A | 4/1990 | Sfarti et al. |
| 4,926,323 A | 5/1990 | Baror et al. |
| 4,939,684 A | 7/1990 | Gehrig et al. |
| 4,962,500 A | 10/1990 | Nakagawa |
| 5,148,532 A | 9/1992 | Narita et al. |
| 5,155,698 A | 10/1992 | Niimi et al. |
| 5,155,843 A | 10/1992 | Stamm et al. |
| 5,220,670 A | 6/1993 | Arakawa et al. |
| 5,274,770 A | 12/1993 | Khim Yeoh et al. |
| 5,294,928 A | 3/1994 | Cooper et al. |
| 5,295,250 A | 3/1994 | Komoto et al. |
| 5,317,701 A | 5/1994 | Reininger et al. |
| 5,327,536 A | 7/1994 | Suzuki |
| 5,333,119 A | 7/1994 | Raatz et al. |

(Continued)

FOREIGN PATENT DOCUMENTS

| | | |
|---|---|---|
| EP | 0055370 A2 | 7/1982 |
| JP | 06 332693 A | 12/1994 |
| JP | 2001 282548 A | 10/2001 |
| WO | WO 96/09583 A | 9/1995 |

OTHER PUBLICATIONS

Gilson, Kent L. et al., "The Nano Processor: a Low Resource Reconfigurable Processor" IEEE Workshop on FPGAs for Custom Computing Machines, Apr. 11, 2004, p. 2, col. 2, paragraphs 3-4; p. 3, col. 1, paragraph 3 to col. 2, paragraph 2; p. 5, col. 1, paragraph 6 to col. 1, paragraph 3; and Figure 2.

(Continued)

*Primary Examiner* — Gregory A Kessler
(74) *Attorney, Agent, or Firm* — Fenwick & West LLP (57) ABSTRACT

A microprocessor architecture having extendible logic. One or more customized applications are available to the instruction pipeline. The customizable applications may include software, extension logic instruction or register, dynamically configurable hardware logic, or combinations of these. In order to enable the operating system to interface with the customized extension applications, at least one software extension is provided to the operating system. When a specific extension is requested a software exception is generated by the OS. In response to the exception, the least one software extension is called to handle context switch and dynamic configuration of the extendible logic of the microprocessor.

32 Claims, 2 Drawing Sheets

(56) References Cited

U.S. PATENT DOCUMENTS

| | | | |
|---|---|---|---|
| 5,423,011 | A | 6/1995 | Blaner |
| 5,450,586 | A | 9/1995 | Kuzara et al. |
| 5,454,117 | A | 9/1995 | Puziol et al. |
| 5,475,856 | A | 12/1995 | Kogge |
| 5,485,625 | A | 1/1996 | Gumkowski |
| 5,493,687 | A | 2/1996 | Garg et al. |
| 5,509,129 | A | 4/1996 | Guttag et al. |
| 5,517,436 | A | 5/1996 | Andreas et al. |
| 5,530,825 | A | 6/1996 | Black et al. |
| 5,542,074 | A | 7/1996 | Kim et al. |
| 5,560,036 | A | 9/1996 | Yoshida |
| 5,566,357 | A | 10/1996 | Holcman |
| 5,584,031 | A | 12/1996 | Burch et al. |
| 5,586,279 | A | 12/1996 | Pardo et al. |
| 5,590,350 | A | 12/1996 | Guttag et al. |
| 5,590,351 | A | 12/1996 | Sowadsky et al. |
| 5,600,674 | A | 2/1997 | Bonet et al. |
| 5,600,847 | A | 2/1997 | Guttag et al. |
| 5,636,363 | A | 6/1997 | Bourekas et al. |
| 5,642,500 | A | 6/1997 | Inoue |
| 5,655,122 | A | 8/1997 | Wu |
| 5,692,168 | A | 11/1997 | McMahan |
| 5,696,954 | A | 12/1997 | Guttag et al. |
| 5,696,958 | A | 12/1997 | Mowry et al. |
| 5,713,028 | A | 1/1998 | Takahashi et al. |
| 5,727,211 | A * | 3/1998 | Gulsen ............... 718/108 |
| 5,752,014 | A | 5/1998 | Mallick et al. |
| 5,768,602 | A | 6/1998 | Dhuey |
| 5,774,709 | A | 6/1998 | Worrell |
| 5,778,423 | A | 7/1998 | Sites et al. |
| 5,784,636 | A | 7/1998 | Rupp |
| 5,805,876 | A | 9/1998 | Bose et al. |
| 5,809,293 | A | 9/1998 | Bridges et al. |
| 5,826,079 | A | 10/1998 | Boland et al. |
| 5,826,100 | A | 10/1998 | Bonet et al. |
| 5,835,753 | A | 11/1998 | Witt |
| 5,848,264 | A | 12/1998 | Baird et al. |
| 5,878,264 | A | 3/1999 | Ebrahim |
| 5,893,151 | A | 4/1999 | Merchant |
| 5,896,305 | A | 4/1999 | Bosshart et al. |
| 5,907,498 | A | 5/1999 | Rim |
| 5,909,566 | A | 6/1999 | Cai et al. |
| 5,920,711 | A | 7/1999 | Seawright et al. |
| 5,931,950 | A | 8/1999 | Hsu |
| 5,948,099 | A | 9/1999 | Crawford et al. |
| 5,950,120 | A | 9/1999 | Gardner et al. |
| 5,964,884 | A | 10/1999 | Partovi et al. |
| 5,978,909 | A | 11/1999 | Lempel |
| 5,996,071 | A | 11/1999 | White et al. |
| 6,014,743 | A | 1/2000 | Henry et al. |
| 6,021,500 | A | 2/2000 | Wang et al. |
| 6,026,478 | A | 2/2000 | Dowling |
| 6,029,222 | A * | 2/2000 | Kamiya ............... 710/262 |
| 6,035,374 | A | 3/2000 | Panwar et al. |
| 6,038,649 | A | 3/2000 | Ozawa et al. |
| 6,044,458 | A | 3/2000 | Rinkenberger et al. |
| 6,058,142 | A | 5/2000 | Ishikawa et al. |
| 6,061,521 | A | 5/2000 | Thayer et al. |
| 6,076,158 | A | 6/2000 | Sites et al. |
| 6,088,034 | A | 7/2000 | Deering |
| 6,088,786 | A | 7/2000 | Feierbach et al. |
| 6,128,747 | A | 10/2000 | Thoulon |
| 6,141,673 | A | 10/2000 | Thayer et al. |
| 6,151,672 | A | 11/2000 | Hunt |
| 6,154,857 | A | 11/2000 | Mann |
| 6,157,988 | A | 12/2000 | Dowling |
| 6,163,851 | A | 12/2000 | Yamazoe et al. |
| 6,185,732 | B1 | 2/2001 | Mann et al. |
| 6,189,091 | B1 | 2/2001 | Col et al. |
| 6,226,738 | B1 | 5/2001 | Dowling |
| 6,240,521 | B1 | 5/2001 | Barber et al. |
| 6,253,287 | B1 | 6/2001 | Green |
| 6,289,417 | B1 | 9/2001 | Larri |
| 6,292,879 | B1 | 9/2001 | Fong |
| 6,308,249 | B1 | 10/2001 | Okazawa |
| 6,308,279 | B1 | 10/2001 | Toll et al. |
| 6,327,651 | B1 | 12/2001 | Dubey et al. |
| 6,339,822 | B1 | 1/2002 | Miller |
| 6,343,337 | B1 | 1/2002 | Dubey et al. |
| 6,347,379 | B1 | 2/2002 | Dai et al. |
| 6,353,882 | B1 | 3/2002 | Hunt |
| 6,412,038 | B1 | 6/2002 | Mehalel |
| 6,412,066 | B2 | 6/2002 | Worrell et al. |
| 6,427,206 | B1 | 7/2002 | Yeh et al. |
| 6,438,700 | B1 | 8/2002 | Adusumilli |
| 6,477,683 | B1 | 11/2002 | Killian et al. |
| 6,499,101 | B1 | 12/2002 | Henry et al. |
| 6,519,696 | B1 | 2/2003 | Henry et al. |
| 6,526,502 | B1 | 2/2003 | Col et al. |
| 6,550,056 | B1 | 4/2003 | Mizumoto |
| 6,560,754 | B1 | 5/2003 | Hakewill et al. |
| 6,571,331 | B2 | 5/2003 | Henry et al. |
| 6,571,333 | B1 | 5/2003 | Jain et al. |
| 6,584,525 | B1 | 6/2003 | Klingman |
| 6,609,194 | B1 | 8/2003 | Henry et al. |
| 6,622,240 | B1 | 9/2003 | Olson et al. |
| 6,647,491 | B2 | 11/2003 | Hsu et al. |
| 6,671,743 | B1 * | 12/2003 | Verity ............... 719/321 |
| 6,681,295 | B1 | 1/2004 | Root et al. |
| 6,718,460 | B1 | 4/2004 | Prakash |
| 6,718,504 | B1 | 4/2004 | Coombs et al. |
| 6,751,331 | B2 | 6/2004 | Eisenbraun |
| 6,760,833 | B1 | 7/2004 | Dowling |
| 6,774,832 | B1 | 8/2004 | Essenwanger |
| 6,823,444 | B1 | 11/2004 | Henry et al. |
| 6,862,563 | B1 | 3/2005 | Hakewill et al. |
| 6,886,093 | B2 | 4/2005 | Henry et al. |
| 6,895,424 | B2 | 5/2005 | Kirsch |
| 6,909,744 | B2 | 6/2005 | Molloy |
| 6,925,634 | B2 | 8/2005 | Hunter |
| 6,948,052 | B2 | 9/2005 | Nguyen et al. |
| 6,954,845 | B2 | 10/2005 | Arnold et al. |
| 6,963,554 | B1 | 11/2005 | Weigand |
| 6,968,444 | B1 | 11/2005 | Kroesche et al. |
| 6,981,012 | B2 | 12/2005 | Kirsch |
| 7,010,558 | B2 * | 3/2006 | Morris ............... 708/409 |
| 7,093,165 | B2 | 8/2006 | Kageshima |
| 7,162,619 | B2 | 1/2007 | Henry et al. |
| 7,181,596 | B2 * | 2/2007 | Henry et al. ............... 712/209 |
| 2001/0016903 | A1 | 8/2001 | Tremblay |
| 2001/0021974 | A1 | 9/2001 | Lee |
| 2001/0032309 | A1 | 10/2001 | Henry et al. |
| 2001/0040686 | A1 | 11/2001 | Schoolcraft et al. |
| 2001/0044892 | A1 | 11/2001 | Yamaura |
| 2001/0046260 | A1 | 11/2001 | Molloy |
| 2001/0050682 | A1 | 12/2001 | Deering et al. |
| 2001/0056531 | A1 | 12/2001 | McFarling |
| 2002/0053015 | A1 | 5/2002 | Tan et al. |
| 2002/0066006 | A1 | 5/2002 | Worrell |
| 2002/0069351 | A1 | 6/2002 | Chi et al. |
| 2002/0073301 | A1 | 6/2002 | Kahle et al. |
| 2002/0078332 | A1 | 6/2002 | Seznec et al. |
| 2002/0083312 | A1 | 6/2002 | Sinharoy |
| 2002/0087851 | A1 | 7/2002 | Yoshioka |
| 2002/0087852 | A1 | 7/2002 | Jourdan et al. |
| 2002/0100019 | A1 | 7/2002 | Hunter et al. |
| 2002/0100020 | A1 | 7/2002 | Hunter et al. |
| 2002/0138236 | A1 | 9/2002 | Takamura |
| 2002/0157000 | A1 | 10/2002 | Hay et al. |
| 2002/0188833 | A1 | 12/2002 | Henry et al. |
| 2002/0194236 | A1 | 12/2002 | Morris |
| 2002/0194238 | A1 | 12/2002 | Kirsch |
| 2002/0194461 | A1 | 12/2002 | Henry et al. |
| 2002/0194462 | A1 | 12/2002 | Henry et al. |
| 2002/0194463 | A1 | 12/2002 | Henry et al. |
| 2002/0194464 | A1 | 12/2002 | Henry et al. |
| 2002/0198916 | A1 | 12/2002 | Kirsch |
| 2002/0199092 | A1 | 12/2002 | Henry et al. |
| 2003/0023838 | A1 | 1/2003 | Karim et al. |
| 2003/0046614 | A1 | 3/2003 | Brokish |
| 2003/0070013 | A1 | 4/2003 | Hansson |
| 2003/0105793 | A1 | 6/2003 | Guttag et al. |
| 2003/0126508 | A1 | 7/2003 | Litt |
| 2003/0154359 | A1 | 8/2003 | Henry et al. |

(56) References Cited

U.S. PATENT DOCUMENTS

| | | |
|---|---|---|
| 2003/0154463 A1 | 8/2003 | Betker et al. |
| 2003/0159009 A1 | 8/2003 | Henry et al. |
| 2003/0159020 A1 | 8/2003 | Henry et al. |
| 2003/0172252 A1 | 9/2003 | Henry et al. |
| 2003/0188129 A1 | 10/2003 | Henry et al. |
| 2003/0188130 A1 | 10/2003 | Henry et al. |
| 2003/0188131 A1 | 10/2003 | Henry et al. |
| 2003/0188133 A1 | 10/2003 | Henry et al. |
| 2003/0188140 A1 | 10/2003 | Henry et al. |
| 2003/0196077 A1 | 10/2003 | Henry et al. |
| 2003/0204705 A1 | 10/2003 | Oldfield et al. |
| 2003/0221091 A1 | 11/2003 | Henry et al. |
| 2003/0225998 A1 | 12/2003 | Khan et al. |
| 2004/0015683 A1 | 1/2004 | Emma et al. |
| 2004/0049660 A1 | 3/2004 | Jeppesen et al. |
| 2004/0068643 A1 | 4/2004 | Dowling |
| 2004/0098569 A1* | 5/2004 | Smith et al. ............ 712/229 |
| 2004/0139281 A1 | 7/2004 | McDonald |
| 2004/0172524 A1 | 9/2004 | Hoogerbrugge |
| 2004/0186985 A1 | 9/2004 | Tran et al. |
| 2004/0193843 A1 | 9/2004 | Altshuler et al. |
| 2004/0193852 A1 | 9/2004 | Johnson |
| 2004/0193855 A1 | 9/2004 | Kacevas et al. |
| 2004/0225870 A1 | 11/2004 | Srinivasan et al. |
| 2004/0225871 A1 | 11/2004 | Irie et al. |
| 2004/0225872 A1 | 11/2004 | Bonanno et al. |
| 2004/0225949 A1 | 11/2004 | Coombs et al. |
| 2004/0230782 A1 | 11/2004 | Busaba et al. |
| 2004/0250045 A1 | 12/2004 | Dowling |
| 2004/0254965 A1 | 12/2004 | Glernalczyk et al. |
| 2004/0255100 A1 | 12/2004 | Kershaw |
| 2004/0255104 A1 | 12/2004 | Akkary et al. |
| 2004/0268102 A1 | 12/2004 | Combs et al. |
| 2005/0027970 A1 | 2/2005 | Arnold et al. |
| 2005/0027971 A1 | 2/2005 | Williams et al. |
| 2005/0027974 A1 | 2/2005 | Lempel |
| 2005/0050309 A1 | 3/2005 | Yamashita et al. |
| 2005/0060457 A1 | 3/2005 | Olukotun |
| 2005/0066305 A1 | 3/2005 | Lisanke |
| 2005/0076193 A1 | 4/2005 | Henry et al. |
| 2005/0091479 A1 | 4/2005 | Chung |
| 2005/0097398 A1 | 5/2005 | Day et al. |
| 2005/0102492 A1 | 5/2005 | Henry et al. |
| 2005/0125613 A1 | 6/2005 | Kim et al. |
| 2005/0125632 A1 | 6/2005 | Alsup et al. |
| 2005/0125634 A1 | 6/2005 | Ishizuka |
| 2005/0132175 A1 | 6/2005 | Henry et al. |
| 2005/0138607 A1 | 6/2005 | Lu |
| 2005/0154867 A1 | 7/2005 | DeWitt et al. |
| 2005/0169550 A1 | 8/2005 | Arnold et al. |
| 2005/0172277 A1 | 8/2005 | Chheda et al. |
| 2005/0174270 A1 | 8/2005 | Koo et al. |
| 2005/0188179 A1 | 8/2005 | Henry et al. |
| 2005/0204121 A1 | 9/2005 | Burdass |
| 2005/0216703 A1 | 9/2005 | Dieffenderfer et al. |
| 2005/0216713 A1 | 9/2005 | Prasky et al. |
| 2005/0223202 A1 | 10/2005 | Peri et al. |
| 2005/0273559 A1 | 12/2005 | Aristodemou et al. |
| 2005/0273581 A1 | 12/2005 | Arnold et al. |
| 2005/0278505 A1 | 12/2005 | Lim et al. |
| 2005/0278513 A1 | 12/2005 | Aristodemou et al. |
| 2005/0278517 A1 | 12/2005 | Wong et al. |
| 2005/0289323 A1 | 12/2005 | Wong et al. |
| 2006/0015706 A1 | 1/2006 | Lai |
| 2006/0036836 A1 | 2/2006 | Gelman et al. |
| 2006/0041868 A1 | 2/2006 | Huang |

OTHER PUBLICATIONS

Hennessy, John L. et al., A Computer Architecture: A Quantitative Approach, Second Edition, San Francisco, California: Morgan Kaufman Publishers, Inc. 1996, p. 71, paragraph 4; pp. 87-88, paragraphs 8 to 1; Figure 2.17 and Caption.
Altera, FLEX 10K—Embedded Programmable Logic Device Family, 2003, Altera, pp. 1, 6.
Bäck, D. et al., "Evaluation of Techniques for Reducing the Energy-Delay Product in a JAVA Processor," Chalmers University of Technology, Department of Computer Engineering, 1999, 12 pages.
Fritts, J. et al., "Instruction Fetch Characteristics of Media Processing," Proceedings of SPIE Photonics West, Media Processors, 2002, pp. 1-12.
Hennessy et al, Computer Architecture—A Quantitative Approach, Morgan Kaufmann Publishiers, 2003, pp. 197-199.
McFarling, S. et al., "Reducing the Cost of Branches," IEEE, 1986, pp. 396-403.
Lee, J.K.F. et al., "Branch Prediction Strategies and Branch Target Buffer Design," IEEE Computer, Jan. 1984, pp. 6-22.
Johnson, W., Superscalar Microprocessor Design, Prentice Hall, 1991, p. 22.
Patterson, D. A. et al., "A Computer Architecture: A Quantitative Approach," Second Edition, San Francisco. California: Morgan Kaufman Publishers, Inc., 1990, pp. 252-278.
PCT International Search Report, PCT Application No. PCT/US01/51064, Jan. 15, 2003, 5 pages.
PCT International Search Report and Written Opinion, PCT Application No. PCT/US05/17586, Nov. 27, 2006, 18 pages.
PCT International Search Report, PCT/GB95/02283, Apr. 19, 1996, 3 pages.
Sherwood, T. et al., "Automated Design of Finite State Machine Predictors for Customized Processors," IEEE, 2001, pp. 86-97.
Su, C-L. et al., "Low Power Architecture Design and Compilation Techniques for High-Performance Processor," published in Proceedings of COMPCON 1994, Apr. 1994, dated Feb. 15, 1994.
Tabak, D., "Advanced Microprocessors," McGraw-Hill, Second Edition, 1995, ISBN 0-07-062843-2, Chapter 5: Pipelining, pp. 67-78.
UK Examination Report, UK Patent Application No. GB0622477.8, Dec. 3, 2007, 1 page.
United States Office Action, U.S. Appl. No. 11/132,423, Jan. 22, 2008, 14 pages.
United States Office Action, U.S. Appl. No. 11/132,423, Jun. 22, 2007, 19 pages.
United States Office Action, U.S. Appl. No. 11/132,423, Feb. 27, 2007, 14 pages.
United States Office Action, U.S. Appl. No. 11/132,432, Jul. 3, 2007, 8 pages.
United States Office Action, U.S. Appl. No. 10/083,057, May 20, 2004, 19 pages.
United States Office Action, U.S. Appl. No. 10/083,057, Jun. 17, 2005, 15 pages.
United States Office Action, U.S. Appl. No. 11/132,428, Mar. 19, 2008, 10 pages.
United States Office Action, U.S. Appl. No. 11/132,428, Jun. 7, 2007, 8 pages.
United States Office Action, U.S. Appl. No. 11/132,447, Feb. 27, 2007, 20 pages.
United States Office Action, U.S. Appl. No. 11/132,447, Jul. 18, 2007, 19 pages.
United States Office Action, U.S. Appl. No. 11/132,448, Jan. 8, 2009, 11 pages.
United States Office Action, U.S. Appl. No. 11/132,448, Jul. 18, 2008, 11 pages.
U.S. Appl. No. 10/423,745 (issued as U.S. Patent 7,475,000), filed Apr. 25, 2003, Inventors Cook et al.
U.S. Appl. No. 10/651,560, filed Aug. 29, 2003, Inventors Hewitt et al.
Wirthlin, M.J. et al., "The Nano Processor: A Low Resource Reconfigurable Processor," IEEE Workshop on FPGAs for Custom Computing Machines, Apr. 11, 1994, pp. 23-30.

* cited by examiner

MICROPROCESSOR ARCHITECTURE HAVING EXTENDIBLE LOGIC

CROSS REFERENCE TO RELATED APPLICATIONS

This application claims priority to provisional application No. 60/572,238 filed May 19, 2004, entitled "Microprocessor Architecture" hereby incorporated by reference in its entirety.

FIELD OF THE INVENTION

This invention relates generally to microprocessor architecture and more specifically to an improved architecture and mode of operation of a microprocessor having extendible logic.

BACKGROUND OF THE INVENTION

Extendible microprocessors have been developed which allow the user to add application-specific logic extensions to a base microprocessor design. This technique seeks to share the benefits of a standard microprocessor design and application-specific logic. By utilizing a standard microprocessor, a designer would seek to perform the majority of required functions by executing program code. The designer will benefit from the flexibility of this approach—the function of the design can be changed after hardware is produced by changing the program code. The designer will also benefit by having access to existing software infrastructure such as compilers, debuggers, operating systems and application code. By utilizing an application-specific logic design, a designer could gain the maximum performance for the application with the minimum logic area—however the function of the design will be fixed in hardware and no changes can be made once the hardware is produced.

The extendible microprocessor shares the benefits of these two approaches—special application-specific extension instructions, registers and interfaces are added to the design. As in the standard microprocessor case, the function of the design is still controlled by a software program, hence the function of the design can still be changed after hardware is produced; and software infrastructure designed for the base microprocessor can be used with extended variants of the processor. High performance can be obtained as key parts of the program are accelerated by adding the application-specific extension functions.

Some disadvantages of the previously described approaches still exist—in some cases software designed for the base microprocessor must be modified for use with an extended variant, this applies especially to operating systems (OS); once hardware is produced the function of the application-specific extensions cannot be changed, meaning that any changes to the function of the design must be achieved by changes to the program that sequences the base and extension operations.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

As background to the techniques discussed herein, the following references are incorporated herein by reference: U.S. Pat. No. 6,862,563 issued Mar. 1, 2005 entitled "Method And Apparatus For Managing The Configuration And Functionality Of A Semiconductor Design" (Hakewill et al.); U.S. Ser. No. 10/423,745 filed Apr. 25, 2003, entitled "Apparatus and Method for Managing Integrated Circuit Designs"; and U.S. Ser. No. 10/651,560 filed Aug. 29, 2003, entitled "Improved Computerized Extension Apparatus and Methods", all assigned to the assignee of the present invention.

SUMMARY OF THE INVENTION

Thus, there exists a need for a microprocessor architecture which ameliorates and/or eliminates the above noted problems. In particular, there exists a need for a microprocessor architecture with reduced power consumption, improved performance and reduction of silicon footprint as compared with state of the art microprocessors. In addition, there exists a need to allow an operating system to be used with application-specific extensions added to an extendible processor. Furthermore, there exists a need to allow different sets of application-specific extensions to be used with a common operating system design, without requiring the user to make changes to that operating system.

In various embodiments, this is accomplished with a microprocessor architecture in which extendible logic may be added to the microprocessor through fixed-function hardware or programmable logic extensions. An extendible microprocessor may be configured to provide customizable operation specific logic. These operation specific logic blocks, known as extensions, may be implemented as fixed-function logic. These extensions may also be implemented through the addition of a block of dynamically configurable logic connected to the extendible processor. However, such logic may not and should not be available to all other processes. Thus, an extension register disable/enable function will be available to the OS to selectively disable or enable the access to extension registers and instructions. In various exemplary embodiments, when switching between processes the state of the current extendible logic must be stored for future calls to the same process. The operating system, because it was written prior to the extendible logic, will likely not understand how to handle requests for particular extendible operations or switches between operations. In various embodiments, a series of software extensions, analogous to device drivers, are installed to the OS which define properties such as the instruction and register locations associated with each extension and how that extension may be enabled/disabled. Also, recording all of the state information of a particular extendible logic configuration is very costly in terms of time. Therefore, in various embodiments, a technique known as lazy context switching is employed to perform context switches of extension state only when strictly necessary. When a task is switched out, access to all extension state is disabled but the contents of that extension state are not saved. After switching in a new task, when access to a specific extension is requested an exception is generated as access to that extension is disabled. In various exemplary embodiments, the OS calls the software extensions (drivers) to determine whether the exception is a genuine error, or a valid request to extension logic. When a task has made a valid request to use a disabled extension, the OS determines which task last used the disabled extension. If the last use was by the requesting task, no context switch is necessary. If the extension was last used by a different task, a context switch is performed. After this, the extension is enabled until the next task switch—when it is once more disabled.

At least one embodiment provides a method of selectively providing dynamically configurable extendible microprocessor logic supported by an operating system executing on the microprocessor. The method of selectively providing dynamically configurable extendible microprocessor logic supported by an operating system executing on the microprocessor according to this embodiment may comprise providing at least one block of dynamically configurable extension logic and at least one software extension to the operating system. On a software exception generated when a specific extension logic is requested, the operating system calls the least one software extension to handle dynamic configuration of the extendible logic of the microprocessor.

In this embodiment, all extensions are disabled on a task switch. When access to a specific extension is requested, an exception is generated as access to that extension is disabled. In various exemplary embodiments, the OS will call the software extensions (drivers) in order to determine whether the exception is a genuine error, or a valid request to extension logic. In addition to providing for lazy context switch, the OS calls the software extensions (drivers) to determine whether the extension logic expected by the task is loaded into the dynamically configurable extension logic block. If the required extension is loaded, no further action is necessary. If the extension is not loaded, the software extension controls loading of the required extension into the dynamically configurable extension logic block. This method is known as a virtual hardware extensions scheme due to its ability to dynamically configure (swap in) different extension logic hardware as required by any particular task.

At least one additional embodiment provides a method of selectively providing context switch support for extendible microprocessor logic to an operating system executing on the microprocessor. The method of selectively providing context switch support for extendible microprocessor logic to an operating system executing on the microprocessor according to this embodiment may comprise providing at least one software extension to the operating system, the software extension defining properties including instruction and register locations of the extendible logic and how that extendible logic may be enabled/disabled, generating a software exception when a specific extendible logic is requested, and in response to the exception, calling with the operating system the least one software extension to perform context switching of data contained within the specific extendible logic.

Another embodiment of the invention provides a method of selectively providing dynamically configurable extendible microprocessor logic to an operating system executing on the microprocessor. The method of selectively providing dynamically configurable extendible microprocessor logic to an operating system executing on the microprocessor according to the embodiment may comprise providing at least one software extension to the operating system, generating a software exception when a specific extension logic is requested, and in response to the exception, calling with the operating system the least one software extension to handle dynamic configuration of the extendible logic of the microprocessor.

A further embodiment of the invention provides an extendible microprocessor. The extendible microprocessor according to this embodiment may comprise a microprocessor having a multi-stage instruction pipeline, and an extension interface to the instruction pipeline adapted to complement a standard microprocessor instruction set with customized processor instructions and registers.

Still another embodiment of the invention provides a microprocessor architecture. The microprocessor architecture according to this embodiment may comprise a multi-stage instruction pipeline, an instruction extension interface for interfacing with at least one stage of the instruction pipeline, a plurality of extension applications available to an operating system through the instruction pipeline, a required extension determining circuit, routine or application for identifying instructions in the pipeline that require one of the plurality of extension applications, and an extension register disable/enable circuit, routine or application available to the operating system for selectively enabling and disabling extension applications.

Other aspects and advantages of the invention will become apparent from the following detailed description, taken in conjunction with the accompanying drawings, illustrating by way of example the principles of the invention.

DETAILED DESCRIPTION OF THE DISCLOSURE

The following description is intended to convey a thorough understanding of the invention by providing specific embodiments and details involving various aspects of a new and useful microprocessor architecture. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

Figure 1:
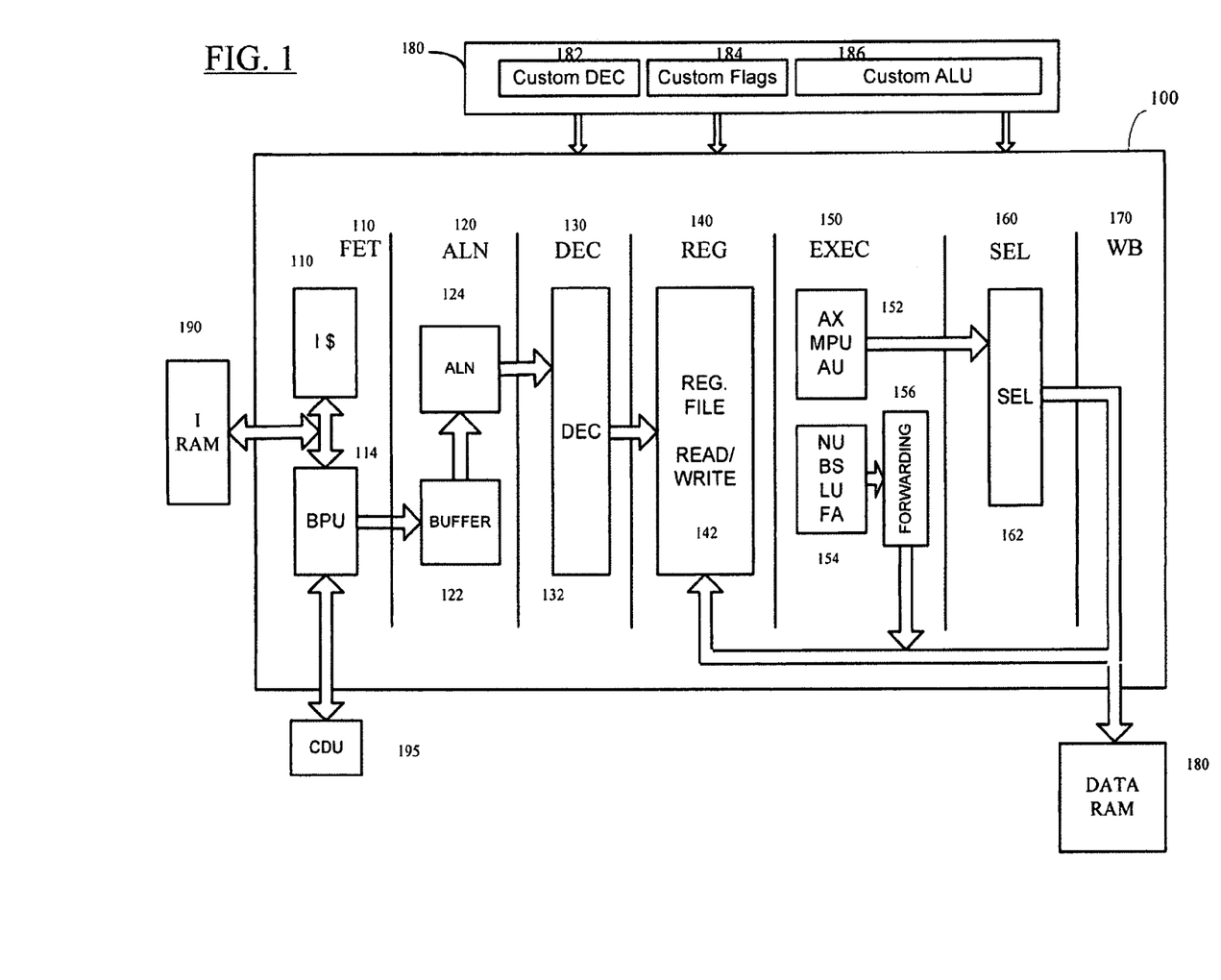
FIG. 1 is a block diagram illustrating a processor core in accordance with at least one exemplary embodiment of this invention.

Discussion of the invention will now made by way of example in reference to the various drawing figures. FIG. 1 illustrates in block diagram form, an architecture for a microprocessor core 100 and peripheral hardware structure in accordance with at least one exemplary embodiment of this invention. Several novel features will be apparent from FIG. 1 which distinguish the illustrated microprocessor architecture from that of the conventional microprocessor architecture. Firstly, the microprocessor architecture of FIG. 1 features a processor core 100 having a seven stage instruction pipeline. An align (ALN) stage 120 is shown in FIG. 1 following the fetch (FET) stage 110. Because the microprocessor core 100 shown in FIG. 1 is operable to work with a variable bit-length instruction set, namely, 16-bits, 32-bits, 48-bits or 64-bits, the align stage 120 formats the words coming from the fetch stage 110 into the appropriate instructions.

In various exemplary embodiments, instructions are fetched from memory in 32-bit words. Thus, when the fetch stage 110 fetches a 32-bit word at a specified fetch address, the entry at that fetch address may contain an aligned 16-bit or 32-bit instruction, an unaligned 16 bit instruction preceded by a portion of a previous instruction, or an unaligned portion of a larger instruction preceded by a portion of a previous instruction based on the actual instruction address. For example, a fetched word may have an instruction fetch address of 0x4, but an actual instruction address of 0x6. In various exemplary embodiments, the 32-bit word fetched from memory is passed to the align stage 120 where it is aligned into an complete instruction. In various exemplary embodiments, this alignment may include discarding superfluous 16-bit instructions or assembling unaligned 32-bit or larger instructions into a single instructions. After completely assembling the instruction, the N-bit instruction is forwarded to the decoder 130.

Still referring to FIG. 1, an instruction extension interface 180 is also shown which permits interface of customized processor instructions that are used to complement the standard instruction set architecture of the microprocessor. Interfacing of these customized instructions occurs through a timing registered interface to the various stages of the microprocessor pipeline 100 in order to minimize the effect of critical path loading when attaching customized logic to a pre-existing processor pipeline. Specifically, a custom opcode slot is defined in the extensions instruction interface for the specific custom instruction in order for the microprocessor to correctly acknowledge the presence of a custom instruction 182 as well as the extraction of the source operand addresses that are used to index the register file 142. The custom instruction flag interface 184 is used to allow the addition of custom instruction flags that are used by the microprocessor for conditional evaluation using either the standard condition code evaluators or custom extension condition code evaluators in order to determine whether the instruction is executed or not based upon the condition evaluation result of the execute stage (EXEC) 150. A custom ALU interface 186 permits user defined arithmetic and logical extension instructions the result of which are selected in the result select stage (SEL) 160.

Figure 2:
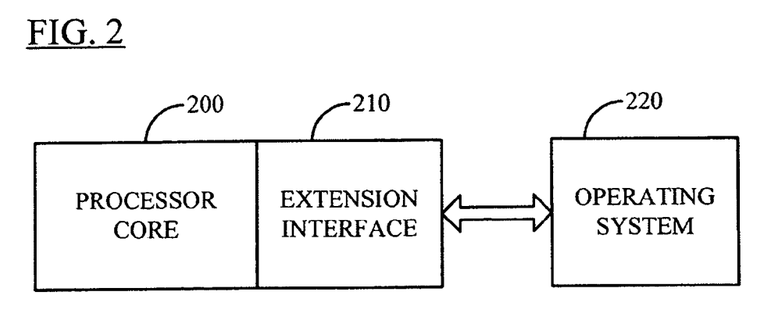
FIGS. 2 and 3 are block diagrams illustrating a microprocessor architecture utilizing operating system supported virtual hardware extensions in accordance with at least one exemplary embodiment of this invention.
Figure 3:
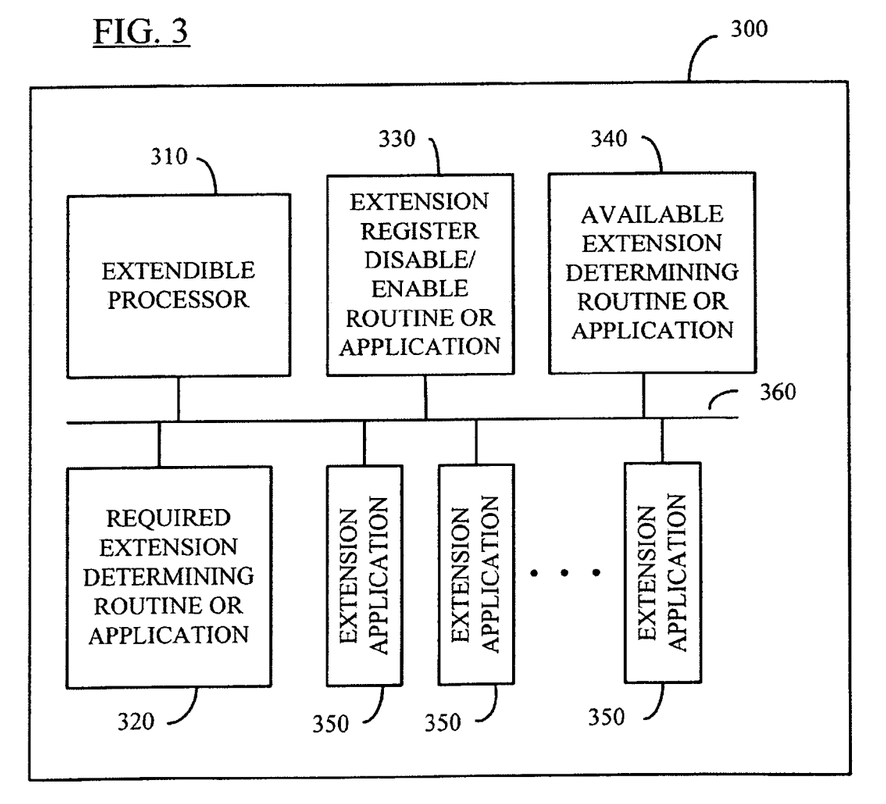

FIGS. 2 and 3 are block diagrams illustrating a microprocessor architecture utilizing operating system supported virtual hardware extensions in accordance with at least one exemplary embodiment of this invention. A microprocessor in accordance with at least one embodiment of this invention is capable of logic extension by a user by way of an interface by which extension instructions and registers may be added. Certain slots in the processor's instruction set and register map are reserved to functions reached through this interface. By this interface, special instructions including digital signal processor (DSP) instructions, state machine and related machine state may be extended to the processor in order to make available and/or accelerate applications critical to implementers (customers) of the microprocessor.

In various exemplary embodiments, this extension interface may be used to add fixed function logic, as in an application specific integrated circuit (ASIC), or may be connected to an array of programmable logic (FPGA or PLD block). When connected to an array of programmable logic, it will be possible to dynamically change the behavior of the extension functions based on the current needs of the system. This embodiment of the invention provides a system in which an array of programmable logic is connected to the extension interface of a microprocessor, and the microprocessor has a mechanism by which it can reconfigure the programmable logic array based on context. As result, the CPU can dynamically reconfigure the extension instructions/registers available to programs running on the processor.

A problem with implementing an interface between an extendible processor and an operating system (OS) is that the OS is usually codified before the processor and any extension software interface has been created. As a result, the OS is incapable of dealing with these extensions without the assistance of drivers or other software routines. FIGS. 2 and 3 illustrate the basic components of a system for in accordance with this embodiment of the invention. FIG. 2 illustrates a microprocessor core 200 that includes a dynamically reconfigurable extension instruction/register logic accessed through an extension interface 210. The extension interface 210 communicates with a software interface 220 of the operating system in response to demands of the operating system. FIG. 3 illustrates a system 300, which can be dynamically reconfigured under the control of the microprocessor. The system 300 includes an extendible processor 310, a required extension determining routine or application 320, an extension register disable/enable routine or application 330, an available extension routine or application 340 and one or more extension applications 350, all interconnected by software interface 360.

In various exemplary embodiments, the required extension determining routine or application 320 will inform the OS which of the possible extension functions are required by a particular program or user application. In various exemplary embodiments, this could take the form of an extension to the ELF executable format. The extension register disable/enable routine or application 330 permits the OS to enable or disable access to extension instructions or registers, either individually or as a group. If an access is made or attempted while the OS has disabled the extension function, an exception is taken. In various exemplary embodiments, the available extension routine or application 340 informs the OS about an available extension function or group of functions. In various exemplary embodiments, this will include configuration information about the extension, including at least which extension instruction slots are used, which extension register slots are used and names of instructions and register used for disassembly and debug. In various exemplary embodiments, this will also include a software function by which the OS can determine if the required extension function is already built into the microprocessor, a software model of the extension to allow software emulation if the extension is not available in hardware, and optionally, a configuration file containing the required extension for reconfigurable hardware connected to the extension interface.

In various exemplary embodiments, before running an application, the user or administrator would register (install) available extension functions with the OS, analogous to a virtual device under Microsoft WINDOWS™. Also, because context switching between extensions requires storing state information of the extendible hardware, a technique known as lazy context switching is used to manage context switching of both machine state stored in both fixed function extensions and dynamically reconfigurable extensions In various exemplary embodiments, when a user application is executed, no extension functions are loaded or enabled. The OS will check to ensure that an extension function specified by the program has been registered. Any access to an extension function (e.g., register read or write, extension instruction execution) by the program will cause an exception—either an illegal instruction exception or an extension disabled extension. In various exemplary embodiments, this will cause the OS to check to see if the instruction exception is caused by an access to an extension function that is required by the program (as specified in the ELF file). Otherwise, the error is a true illegal instruction error and the OS takes its normal error handling action.

In various exemplary embodiments, if the extension to which access is being attempted is specified as being required by the program as determined by the required extension determining routine or application 320, the OS may take one of the following courses of action. If the extension is already built into the microprocessor, the extension (or extension group containing the function) can be enabled. Before the program is allowed to continue, it may be necessary to context switch any state stored in the extension (lazy context switch) if the extension has been in use by some other task. This technique is often used by an OS to minimize the context switch time. Alternatively, if the extension required is available as a dynamically reconfigurable block, the OS must determine whether the extension is already loaded using the available extension routine or application 340. If so, the OS can then check to see if any state in the extension needs to be context switched. If the extension is not loaded, the OS must save the machine state from an extension configuration that is loaded prior to loading the required extension configuration into the dynamically reconfigurable block. The extension (or extension group containing the function) can then be enabled and the program allowed to continue. Finally, if the extension required is not available as a built-in function, or as a dynamically reconfigurable block, the appropriate emulation code (as registered with the OS) can be called to perform the required function in the absence of an existing hardware extension.

The above described embodiment, by making extensions to the OS error handling code and to the executable file format, provides unexpected benefits including, that a common OS can be used on many different configured microprocessors, different executable programs complied for a common Instruction Set Architecture (ISA), but using different sets of extension functions can be run under a multi-tasking OS on any microprocessor using the using the common ISA using software emulation of extension functions, or built-in extension functions themselves. Also, different executable programs compiled for a common ISA, but using different sets of extension functions can be run at speed under a multi-tasking OS on any microprocessor using the common ISA, when that microprocessor features dynamically reconfigurable extension logic. As a result, this could provide a powerful development platform for extension functions by which extension functions can be prototyped in software or programmable logic while also running in a real OS-based environment. Also, this could be used to deliver a field-upgradeable system whereby a new piece of software would be accompanied by hardware acceleration for key functions of that software, making use of dynamically reconfigurable hardware. Existing functions using other extension functions would still be able to operate as the OS can seamlessly manage which extension functions must be preset n it he dynamically reconfigurable hardware for each task.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The invention claimed is:

1. In a microprocessor, a method of selectively providing context switch support for extendible microprocessor logic to an operating system executing on the microprocessor, the method comprising:

providing at least one software extension to the operating system, the software extension defining properties including instructions, register locations of the extendible microprocessor logic and a function whereby the extendible microprocessor logic may be enabled or disabled, the at least one software extension associated with an illegal instruction exception and an extension disabled exception, the illegal instruction exception indicating that access to the at least one software extension is prohibited and the extension disabled exception indicating that the at least one software extension is available but access to the at least one software extension is currently disabled;

generating, based on whether the at least one software extension is required by a program, either the illegal instruction exception or the extension disabled extension when the at least one software extension is requested by the program; and in response to the extension disabled exception due to the program requiring the at least one software extension, calling with the operating system the at least one software extension to perform context switching of data contained within the portion of the extendible microprocessor logic.

2. The method according to claim 1, wherein the function includes a routine that interfaces with the operating system to selectively disable or enable access to extendible logic.

3. The method according to claim 2, wherein the routine includes an extension register disable/enable application.

4. The method according to claim 1, further comprising providing a switching function to enable switching between software processes using the extendible microprocessor logic functions.

5. The method according to claim 4, wherein the switching function is configured for performing lazy context switching.

6. The method according to claim 5, wherein performing lazy context switching includes storing a state of the data contained within the current extendible microprocessor logic.

7. In a microprocessor, a method of selectively providing dynamically configurable extendible microprocessor logic to an operating system executing on the microprocessor, the method comprising:

providing at least one software extension to the operating system, the software extension defining properties including instructions, register locations of the extendible microprocessor logic and a function whereby the extendible microprocessor logic may be enabled or disabled, the at least one software extension associated with an illegal instruction exception and an extension disabled exception, the illegal instruction exception indicating that access to the at least one software extension is prohibited and the extension disabled exception indicating that the at least one software extension is available but access to the at least one software extension is currently disabled;

generating, based on whether a specific extension logic is required by a program, either the illegal instruction exception or the extension disabled extension when the specific extension logic of the at least one software extension is requested by the program; and in response to the extension disabled exception due to the program requiring the specific extension logic, calling with the operating system the least one software extension to handle dynamic configuration of the extendible microprocessor logic.

8. The method according to claim 7, further comprising:

providing a routine to the operating system to selectively disable or enable access to the extendible microprocessor logic including extension registers and instructions.

9. The method according to claim 8, wherein the routine includes an extension register disable/enable application to the operating system to selectively disable or enable access to extendible microprocessor logic including extension registers and instructions.

10. The method according to claim 7, further comprising providing a switching function to enable switching between software processes using the extendible microprocessor logic functions.

11. The method according to claim 10, wherein the switching function is configured for storing a state of the data contained within current extendible microprocessor logic for future calls to the same process.

12. The method according to claim 11, wherein storing a state of the data contained within the current extendible microprocessor logic comprises performing lazy context switching.

13. The method according to claim 10, wherein the switching function is configured for storing a state of the contents of a reconfigurable logic block containing extendible microprocessor logic for future calls to the same process.

14. The method according to claim 13, wherein storing a state of the contents of a reconfigurable logic block containing extendible microprocessor logic comprises performing lazy context switching.

15. An extendible microprocessor comprising:
a microprocessor having a multistage instruction pipeline;
an extension software interface to the multistage instruction pipeline adapted to complement a standard microprocessor instruction set with customized processor instructions and registers, the customized processor instructions and registers associated with an illegal instruction exception and an extension disabled exception, the illegal instruction exception indicating that access to one or more of the customized processor instructions and registers is prohibited and the extension disabled exception indicating that one or more of the customized processor instructions and registers is available but access to the one or more of the customized processor instructions and registers is currently disabled; and
a software routine for:
generating, based on whether one of the customized processor instructions and registers is required by a program, either the illegal instruction exception or the extension disabled extension when the one of the customized processor instructions and registers is requested by the program; and
in response to the extension disabled exception due to the program requiring the requested one of the customized processor instructions and registers, calling with an operating system that executes on the extendible microprocessor the extension software interface to perform context switching of data contained within the requested one of the customized processor instructions and registers.

16. The extendible microprocessor according to claim 15, wherein the software routine is further for selectively disabling or enabling the customized processor instructions and registers.

17. The extendible microprocessor according to claim 16, wherein the software routine comprises an extension register disable/enable application provided to the operating system executing on the microprocessor.

18. The extendible microprocessor according to claim 15, further comprising a switching function to enable switching between the customized instructions and registers.

19. The extendible microprocessor according to claim 18, wherein the switching function is configured for storing a state of the current instructions and registers for future calls to the same process.

20. The extendible microprocessor according to claim 19, wherein storing comprises performing lazy context switching.

21. The extendible microprocessor according to claim 18, wherein switching includes reconfiguring a block reconfigurable logic connected to the extension interface.

22. The extendible microprocessor according to claim 21, wherein switching comprises storing a state of the reconfigurable logic area for future calls to the same process.

23. The extendible microprocessor according to claim 22, wherein storing comprises performing lazy context switching.

24. A microprocessor comprising:
a multistage instruction pipeline;
an instruction extension interface for interfacing with at least one stage of the multistage instruction pipeline;
a plurality of extension applications available to an operating system through the instruction pipeline, the plurality of extension applications associated with an illegal instruction exception and an extension disabled exception, the illegal instruction exception indicating that access to one or more of the plurality of extension applications is prohibited and the extension disabled exception indicating that one or more of the plurality of extension applications is available but access to the one or more of the plurality of extension applications is currently disabled;
an extension determining software routine or application for identifying instructions in the multistage instruction pipeline that require one of the plurality of extension applications, the software routine or application defining properties including instructions and register locations for the plurality of extension applications;
a software routine for:
generating, based on whether one of the plurality of extension applications is required by an instruction, either the illegal instruction exception or the extension disabled extension when the one of the plurality of extension applications is requested by the instruction, and
in response to the extension disabled exception due to the instruction being one of the identified instructions that require the requested one of the plurality of extension applications, calling with the operating system the instruction extension interface to perform context switching of data contained within the requested one of the plurality of extension applications; and
an extension register disable/enable routine or application available to the operating system for selectively enabling and disabling the requested one of the plurality of extension applications.

25. The microprocessor according to claim 24, further comprising a routine or application for storing the state of the current extendible logic when switching between extension applications for future calls to the same extension application.

26. The microprocessor according to claim 24, wherein the plurality of extension applications comprises a plurality of operation specific logic blocks.

27. The microprocessor according to claim 24, wherein the plurality of extension applications comprise a block of dynamically configurable logic operable to be configured to perform a plurality of different functions.

28. The microprocessor according to claim 24, further comprising logic for determining whether an extension application requested by a current task is loaded into the dynamically configurable extension logic block.

29. The microprocessor according to claim 28, further comprising logic for loading of the required extension into the dynamically configurable extension logic block.

30. The microprocessor according to claim 24, wherein the plurality of extension applications comprises instruction and register locations associated with each extension, and a function whereby each extension may be enabled/disabled.

31. The microprocessor according to claim 24, further comprising logic for determining, upon receiving a request from a task to use an extension application from a task, if the last use of the application was by the requesting task.

32. The microprocessor according to claim 31, further comprising logic for performing a context switch if the extension was last used by a different task than the requesting task.

* * * * *